April 8, 1930.                G. W. HARDIN                1,754,211
                                AIRCRAFT
                          Filed Nov. 7. 1929        4 Sheets-Sheet  1

Inventor
George W. Hardin,
By Deyne and Kirchner
His Attorneys

April 8, 1930. G. W. HARDIN 1,754,211
AIRCRAFT
Filed Nov. 7, 1929   4 Sheets-Sheet 2
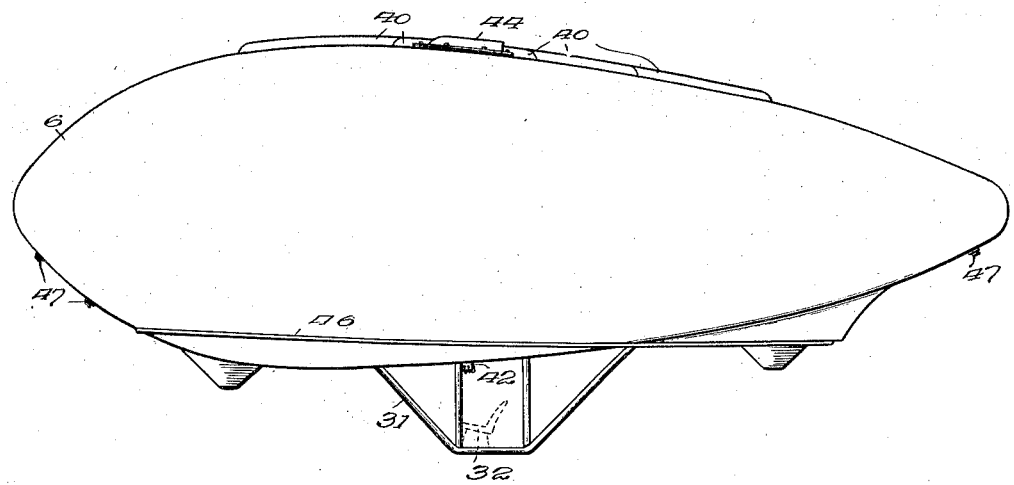
Fig. 2.
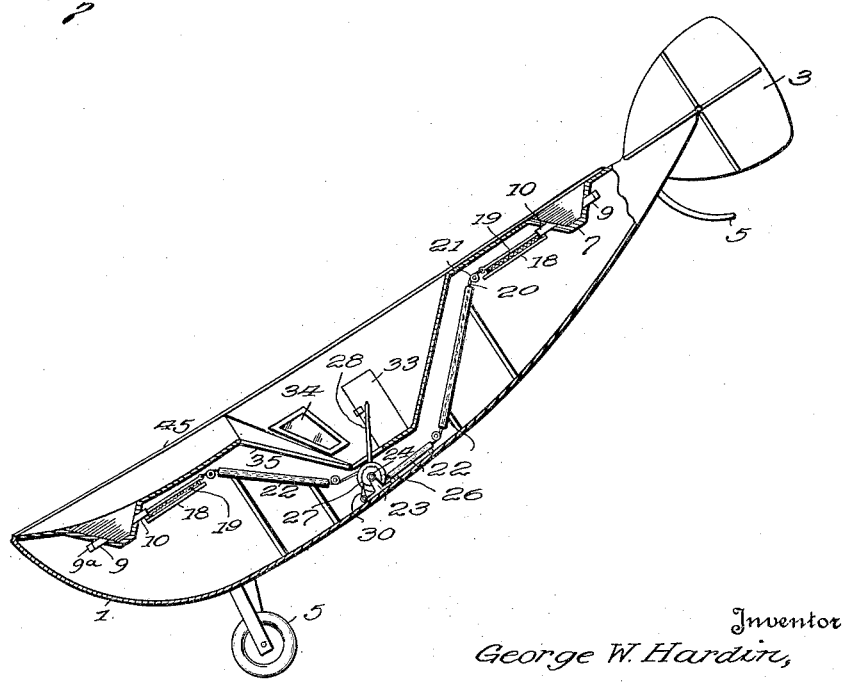
Inventor
George W. Hardin,
By Dyre and Kirchner
His Attorneys April 8, 1930.  G. W. HARDIN  1,754,211
AIRCRAFT
Filed Nov. 7, 1929  4 Sheets-Sheet 3
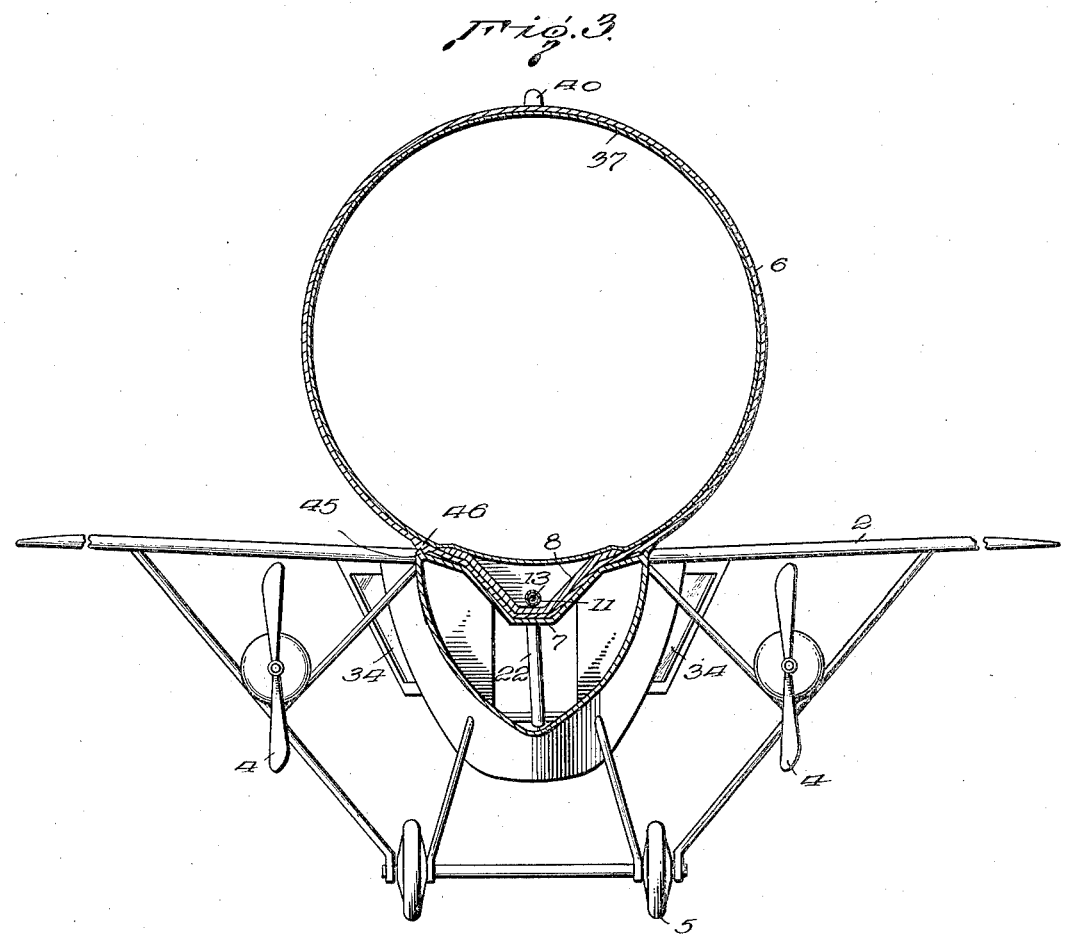
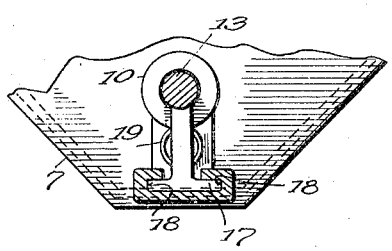
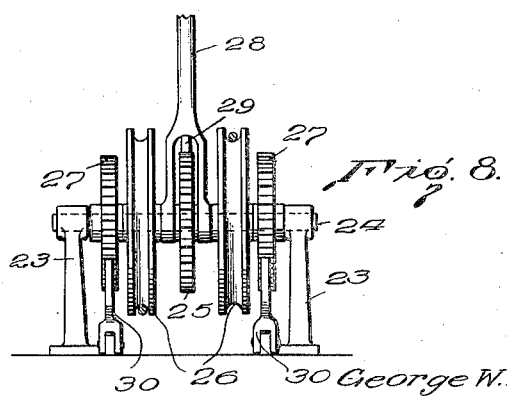
Inventor
George W. Hardin,
By Dyre and Kirchner
His Attorneys

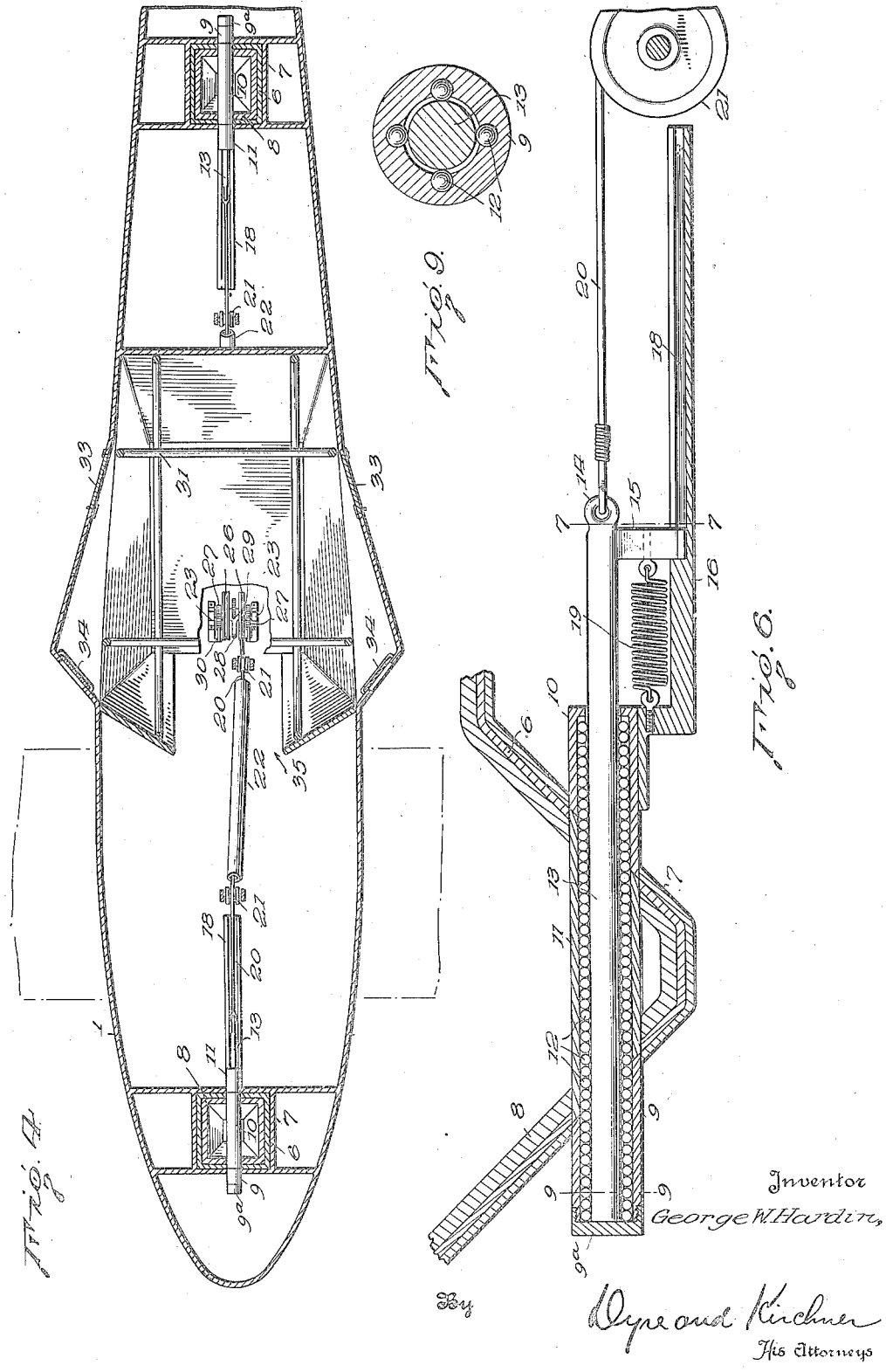

Patented Apr. 8, 1930

1,754,211

UNITED STATES PATENT OFFICE

GEORGE W. HARDIN, OF GREENEVILLE, TENNESSEE

AIRCRAFT

Application filed November 7, 1929. Serial No. 405,484.

My invention relates to aircraft, and more particularly to a novel combination of two different types of aircraft, each capable of independent sustained flight, normally connected but adapted to be readily disconnected in case of emergency.

More especially, my invention contemplates providing a typical heavier-than-air type of airplane with a lighter-than-air element which is normally connected thereto and to which is inseparably attached the cabin, or pilot-, passenger-, and freight-carrying portion of the composite craft. It will be appreciated that my invention consists broadly in modifying a standard type of airplane to carry an aerostat or other lighter than air element to serve, in time of emergency, as a safety means capable of sustaining in the air the valuable load of the composite craft, the dead weight of the disabled airplane part of the combined structure being in such case cut loose and allowed to drop to the earth.

In addition, the lighter-than-air element of my invention affords to the combined elements a certain buoyancy or lift capacity which aids in sustaining the whole craft in the air.

At the present stage of aeronautical development two types of craft have been extensively used. One type is the heavier-than-air airplane provided with wings and motor driven propellers, which obtains its support off the ground solely by the dynamic reaction of the air against its aerofoils. The other type is the airship or balloon in its various forms which is sustained in the air by the buoyancy of a confined gas. The first type has the advantage of being more compact and capable of relatively rapid flight, but is characterized by a very great disadvantage in that failure of the motors necessitates immediate descent. The second type has the advantage of a relatively high degree of safety, being independent of motor failure, fuel exhaustion and the like, but is comparatively slow in flight, is bulky and has a very restricted pay load lift capacity, over and above the weight of motors, fuel and structure of the craft.

It is an object of my present invention to provide an aircraft which will largely combine the advantages of the two conventional types described above, that is, which will be substantially as compact, inexpensive and rapid as the airplane, and in which the safety of the valuable load will be independent of motor operation.

Other and further objects and advantages will sufficiently appear from the description hereinafter of the invention in one preferred form of embodiment.

In the drawings hereto attached, which form part of this application for Letters Patent, and in which the same reference characters indicate the same parts in the several views, Figure 1 is a vertical, central, longitudinal section through a composite craft in connected relation embodying the principles of my present invention, showing certain of the parts in side elevation;

Fig. 2 is a side elevational view on a reduced scale with reference to Fig. 1, with certain of the parts broken away, and showing the two principal elements of my composite craft disconnected;

Fig. 3 is a transverse vertical section along the line 3—3 of Fig. 1;

Fig. 4 is a horizontal longitudinal section through the upper part of the fuselage;

Fig. 5 is a top plan view of a portion of the gas bag showing the gas discharge tubes, valves and valve operating mechanism for controlling the buoyancy of the gas bag;

Fig. 6 is a longitudinal vertical section on a relatively enlarged scale showing one of the connecting pins and apurtenant mechanism;

Fig. 7 is a vertical section along the line 7—7 of Fig. 6;

Fig. 8 is a front elevation of the manually controllable means for actuating the disconnecting pins; and Fig. 9 is a cross section along the line 9—9 of Fig. 6.

Figure 1:
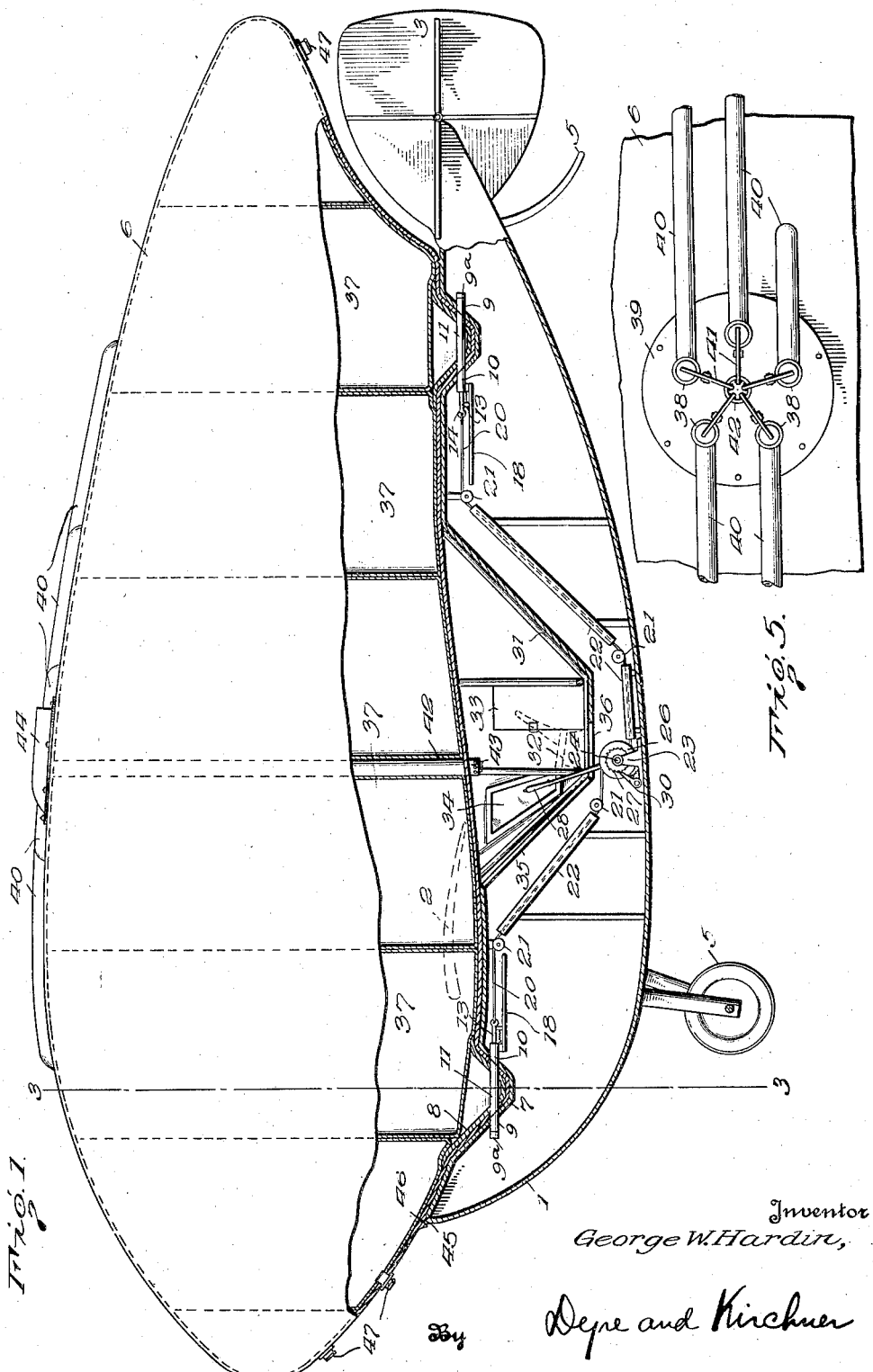

Referring to the drawings, and first to Figs. 1, 2 and 3, the reference numeral 1 indicates generally the fuselage of the heavier-than-air element of my novel aircraft, provided with planes 2, empennage 3, propellers 4, and ground contact members 5, all of any approved design and construction. This heavier-than-air element will be hereinafter referred to in the description and claims as the airplane, and it is to be understood that the details of its construction and its various parts may be modified to suit the preference of the designer and the necessities of its intended use, forming no part of my present invention. It is essential to the spirit of my present invention only that the airplane element be a heavier-than-air airplane incapable of self-sustained flight except when propelled through the air or when supported by the buoyancy of the lighter-than-air element which will presently be described.

The upper part of the fuselage of the airplane is dished or channelled throughout its length to receive the lower part of the lighter-than-air element of my composite aircraft, which consists principally of a gas bag 6. This bag with its appendages will be hereinafter referred to as the airship. The details of its construction are immaterial to the principle of my invention, it being essential only that the airship comprise an envelope containing a volume of buoyant gas sufficient to sustain in the air a suspended cabin and be provided with means for effecting connection normally between the airship and the airplane, as will be presently described more in detail.

Referring now to the airplane element, the upper surface of the fuselage thereof is provided at two points, one fore and one aft of its central portion, with a depressed portion 7 which is preferably of inverted frusto-pyramidal contour. The outer casing of the gas bag 6 is reinforced in its under surface with projecting metal members 8 which are complemental in shape with the depressed portions 7, register therewith, and are normally received therein, as shown by Figs. 1, 3, 4 and 6.

As shown to advantage by Fig. 6, the lower parts of the front and rear walls of the depressed portions 7 and the contained projecting member 8 are perforated. Welded or otherwise secured to the outer walls of the depressed portion 7 in the fuselage and in line with its perforations are two outwardly extending sections of a pin bearing tube, the section farthest removed from the center of the fuselage being designated 9 in the drawings and closed by a screw-threaded cap 9ª. The section closest to the center of the cabin is open and is indicated at 10 in the drawings. These two sections are in alignment, and a third section 11, secured between the perforations in the projecting member 8 is also in alignment with the end sections when the member 8 is fitted into the depressed portion 7 of the fuselage.

The pin bearing tube is provided with a number of balls 12 contained in a plurality of channels in its inner surface, which constitute a bearing surface for the pin 13, the inner end of which pin carries an integral eye 14 and a depending foot 15. A slideway 16 is fixed to the under surface of tube section 10 and extends a short distance in the direction of the center of the airplane. Outwardly extending flanges 17 on the foot 15 are received in grooves 18 in the slideway, and a spring 19 disposed under tension between the foot 15 and the bearing tube end of the slideway 16 urges the outer end of the pin 13 normally to the outer end of the tube section 9. One end of a cable 20 is connected to the eye 14, and it will be apparent that a sufficient pull exerted on this cable will overcome the compression tendency of the spring 19, to retract the pin 13 wholly out of tube sections 9 and 11, as shown in Fig. 2. It will be further apparent that with the parts in this relation all connection will be broken between the airplane and the airship and these two parts will separate, as shown in Fig. 2.

It is to be understood that the details of the foregoing detachable connection form no part of my present invention in its broader aspects, and that any efficient and positive means may be employed without departing from the spirit of my invention. I have, however, found the described connection operative and advantageous, and therefore present it as one preferred embodiment of this part of my invention.

It will be clear also that any appropriate mechanism may be provided to actuate from the pilot's seat in the cabin the two cables 20. One form of such mechanism is shown in the drawings, and especially Figs. 1 and 8. According to this embodiment, the cables 20 are guided from the fore and aft pins 13 over pulleys 21 and through guide tubes 22 to a point in the central portion of the fuselage and adjacent to the floor thereof, where the actuating assembly shown in Fig. 8 is positioned.

This assembly comprises a pair of journal bearing posts 23 secured to the floor of the fuselage and carrying a short shaft 24 which extends transversely of the fuselage. Keyed upon this shaft are a central gear 25, a pulley 26 on each side of the gear 25, and a gear 27 on the outer side of each pulley 26. Straddling the central gear 25 are the arms of a bifurcated lever 28, which arms are loosely mounted on the shaft 24. The lever carries a pawl 29 which is spring pressed to engage the teeth of gear 25, and similar pawls 30 are pivoted in the floor of the fuselage, or otherwise in fixed relation with the journal bearing posts 23, and spring pressed to engage the teeth of the outer gears 27. Each of the cables 20 is secured to the periphery of one of the pulleys 26, the connection being such as to cause the cables to be wound upon the pulleys when the latter are rotated in a given direction. Since the cables are led to the pulleys from opposite directions, and since the two pulleys must rotate in the same direction, one of the cables passes on to its pulley at the top thereof, and the other cable meets the periphery of its pulley at the bottom thereof. The cable ends are preferably fastened in the pulley grooves at points 180° apart.

The reference numeral 31 designates the car or pilot carrying compartment of the airship, which serves also as the cabin or pilot carrying compartment of the airplane, extending down into the fuselage preferably in its central portion, the upper surface of which is at this point suitably depressed. This cabin, it will be understood, is rigidly secured to the gasbag, and is connected to the fuselage of the airplane by agency of the pins 13 and the members 7 and 8 which effect connection between the airplane and the airship. The contour of the cabin, and the depression in the fuselage which receives it, is preferably frusto-pyramidal like the connecting members 7 and 8.

The cabin 31 contains a seat 32 for the pilot, a door 33 and windows 34 in its outer side wall, and an opening 35 in its front wall through which access may be had to the instrument board and controls of the airplane (not shown). A slot 36 is provided in the floor of the cabin through which the lever 28 projects.

It will be appreciated, of course, that the size of the cabin forms no part of my present invention, but will depend on the size of the airplane, the use to which it is to be put, the lift capacity of the gasbag 6, and similar factors.

The gasbag may be rigid or non-rigid and is preferably a single envelope containing a number of independent gas cells 37. I have shown eight such cells, but any number may be used, depending largely on the size of the structure. In order to provide means for causing descent of the airship when disconnected from the airplane, I provide outlet valves 38 for some, but not necessarily all, of the cells. These valves are preferably positioned in a valve plate 39 located on the top of the bag immediately above the cabin 31. Tubes 40 place the valves in communication with their respective gas cells, and valve stem actuating rocker arms 41 pivoted to the plate 39 may be operated by means of pull cords which pass down through a conduit 42 interposed between two of the cells 37. These cords terminate on a board 43 in the cabin 31, and a housing 44 is preferably disposed over the valve plate 39 to protect the valves from injury due to weather conditions, impact against the hangar roof, etc.

The manner of operation of my novel aircraft is briefly as follows: Assuming the composite craft to be in flight over a terrain which is unsuited to safe landing with a "dead stick," and assuming further a failure of the motors, exhaustion of fuel, damage to the airplane, or any other emergency which makes continued flight impossible, the pilot seated in the cabin 31 moves the lever 28 rearwardly from its normal forward position. This will serve to initiate retraction of both pins 13 from their respective tube sections 9 and 11, and should this retraction not be complete, the ratchet and gear arrangement best shown in Fig. 8 and hereinabove more particularly described permits any number of strokes to be made to complete the withdrawal of the pins. As soon as the pins move out of their tubes 11, all connection between the airship and the airplane is broken, and the dead weight of the airplane will cause it to descend, as shown in Fig. 2. In this connection it is to be noted that the frusto-pyramidal contour of the members 7 and 8, and of the fuselage where the cabin penetrates the same, will effectually prevent binding of the interfitting portions of the airship and the airplane regardless of the angle of the craft when the airplane is discharged.

Immediately the disconnection is effected, the airship will rise on account of the static lift of its gas, and will carry up with it the cabin and the pilot, passengers and freight therein contained. The airship may be allowed to float in the manner of any aerostat until over a suitable landing place, when actuation of the valve cords at the board 43 in the cabin will sufficiently deflate selected gas cells to cause descent of the airship.

It will be noted by reference to Figs. 1 and 3 that I prefer to provide a type of weather-tight joint where the surface of the gasbag 6 meets the upper edge of the fuselage 1. I have shown this joint in the form of a tongue 45 provided on the fuselage fitted into a complementary groove 46 formed in material secured to the gasbag. This form of joint provides a water shed for the meeting surfaces of gasbag and fuselage, and in addition helps maintain the two in their interfitted relation with a minimum of stress on the members 7 and 8. It is to be understood, however, that any approved type of joint may be used to advantage.

While it is not necessary, in order to permit the gasbag to be deflated sufficiently to bring the airship to earth, to provide each of the cells 37 with a valve 38 operable from the cabin 31, it is desirable to equip all of the cells with means for exhausting all of the gas therefrom so that the airship may occupy a minimum of space after landing and be conveniently and economically transported back to its base of operations. To this end I provide valves 47 in those cells which do not carry valves 38, as clearly shown in Figs. 1 and 2.

It is desirable that the propellers with which the airplane is provided extend no higher than the surface of the planes 2, to avoid contact with the gasbag 6 when the airplane and the airship are in the act of separating during a tailspin, or nose dive of the craft.

It will be appreciated furthermore that other and further modifications may be made of the details of the described embodiment of my invention, but all such modifications are matters of design in no way essential to the principle of my invention and are to be regarded within the scope and purview of the appended claims.

Having thus described my invention what I claim and desire to secure by Letters Patent is:

1. An aircraft comprising a lighter-than-air craft and a heavier-than-air craft, a pilot carrying car secured to the lighter-than-air craft, a connection between said crafts, means in the car for breaking said connection, and means for actuating the controls of the heavier-than-air craft disposed within access of the car when the crafts are connected.

2. An aircraft comprising a lighter-than-air craft and a heavier-than-air craft, a pilot-carrying car secured to the lighter-than-air craft, a connection between said crafts, means in the car for breaking said connection, means in the car for actuating the controls of the lighter-than-air craft, and means for actuating the controls of the heavier-than-air craft disposed within access of the car when the crafts are connected.

3. An aircraft comprising a lighter-than-air craft and a heavier-than-air craft, a pilot-carrying car connected to the lighter-than-air craft, means for normally connecting the two crafts, in combination with means operable from within the car for breaking said connection, and means for actuating the controls of the heavier-than-air craft positioned to be within access of the car only when the two crafts are connected.

4. An aircraft comprising a heavier-than-air craft including a pilot-carrying compartment, a detachable connection normally securing said craft and said compartment together, a lighter-than-air element, a fixed connection between said element and said compartment, an opening in said compartment to permit actuation from within the compartment of the controls of said heavier-than-air craft, and other means in said compartment for breaking said detachable connection.

5. An aircraft comprising a lighter-than-air craft and a heavier-than-air craft, a pilot-carrying car secured to the lighter-than-air craft, an element secured to said lighter-than-air craft, means for securing said element to said heavier-than-air craft, means associated with the heavier-than-air craft for controlling the flight thereof and normally operable from within the car and other means in said car for detaching said element from said heavier-than-air craft.

6. An aircraft comprising a heavier-than-air craft including a pilot-carrying compartment, a detachable connection normally securing said heavier-than-air craft and said compartment together, a lighter-than-air element, a fixed connection between said element and said compartment, means in said heavier-than-air craft for breaking said detachable connection and an actuating member for said means located so as to be operable from within the compartment when the heavier-than-air craft and the compartment are connected together.

7. An aircraft comprising a heavier-than-air craft including a pilot-carrying compartment, a detachable connection normally securing said heavier-than-air craft and said compartment together, a lighter-than-air element, a fixed connection between said element and said compartment, means in said heavier-than-air craft for breaking said detachable connection and an actuating member for said means located so as to project into the compartment when the heavier-than-air craft and the compartment are connected together.

8. An aircraft comprising an airplane having a fuselage, an inflated gasbag carrying a cabin, a recess in the fuselage to receive the cabin, and means for detachably connecting the airplane and the gasbag.

9. An aircraft comprising an airplane having a fuselage provided with a recess in its upper surface, said recess being of progressively greater cross sectional area from the bottom to the top thereof, an inflated gasbag, a cabin carried by the gasbag complementary in shape with the fuselage recess, and means for detachably connecting the airplane and the gasbag.

10. An aircraft comprising an airplane having a fuselage provided with a frusto-pyramidal recess, an inflated gasbag, a cabin carried by the gasbag complementary in shape with the fuselage recess, and means for detachably connecting the airplane and the gasbag.

11. An aircraft comprising an airplane, a portion of the upper surface thereof being provided with a recess, an inflated gasbag, a member carried thereby and adapted to fit within the recess, and a pin normally passed through the walls of the recess and of the complemental member to secure the airplane and the gasbag together.

12. An aircraft comprising an airplane, a portion of the upper surface thereof being provided with a recess, an inflated gasbag, a member carried thereby and adapted to fit within the recess, a pin normally securing the walls of the recess and of the member together to connect the airplane and the gasbag, and means for withdrawing the pin.

13. An aircraft comprising an airplane, a portion of the upper surface thereof being provided with a recess, an inflated gasbag, a member carried thereby and adapted to fit within the recess, a pin normally securing the walls of the recess and of the member together to connect the airplane and the gasbag, spring means urging the pin to its connecting position, and means for withdrawing the pin against the influence of the spring means.

14. An aircraft comprising an airplane, a portion of the upper surface thereof being provided with a recess of frusto-pyramidal contour, an inflated gasbag, a member carried thereby complemental with the recess and adapted to fit therein, and means for connecting the member with the walls of the recess to secure the airplane and the gasbag together.

15. An aircraft comprising an airplane, a portion of the upper surface thereof being provided with a recess of frusto-pyramidal contour, an inflated gasbag, a member carried thereby complemental with the recess and adapted to fit therein, a pin normally passed through the member and the walls of the recess to secure the airplane and the gasbag together, and means for retracting the pin to disconnect the airplane and the gasbag.

16. An aircraft comprising an airship having a cabin, an airplane having a recess to receive the cabin, means for normally securing the airplane and the airship together, and means positioned in the cabin for breaking said connection.

17. An aircraft comprising an airship having a gasbag and a cabin, an airplane having a recess to receive the cabin, means for normally securing the airplane and the airship together, means positioned in the cabin for breaking said connection, and means positioned in the cabin for partially deflating the gasbag.

In testimony whereof I affix my signature.

GEORGE W. HARDIN.